(No Model.)

W. H. BROWN.
PLANT PROTECTOR.

No. 310,982. Patented Jan. 20, 1885.

WITNESSES:
C. Neveux
C. Sedgwick

INVENTOR:
W. H. Brown
BY Munn & Co
ATTORNEYS.

United States Patent Office.

WILLIAM HENRY BROWN, OF DUNEDIN, FLORIDA.

PLANT-PROTECTOR.

SPECIFICATION forming part of Letters Patent No. 310,982, dated January 20, 1885.

Application filed May 13, 1884. (No model.)

*To all whom it may concern:*

Be it known that I, WILLIAM HENRY BROWN, of Dunedin, in the county of Hillsborough and State of Florida, have invented a new and Improved Plant-Protector, of which the following is a full, clear, and exact description.

The object of my invention is to provide a new and improved device for covering plants to protect them from heat, cold, moisture, the wind, &c., as may be necessary.

The invention consists in a plant-protector formed of two pieces of paper, metal, or other material, each having the shape of a quarter of a hollow globe, which pieces are pivoted to each other at the ends by rivets, and the said rivets have eyes or loops formed on the outer ends, through which eyes stakes are driven into the ground to hold the protector in place.

Reference is to be had to the accompanying drawings, forming part of this specification, in which similar letters of reference indicate corresponding parts in all the figures.

Figure 1:
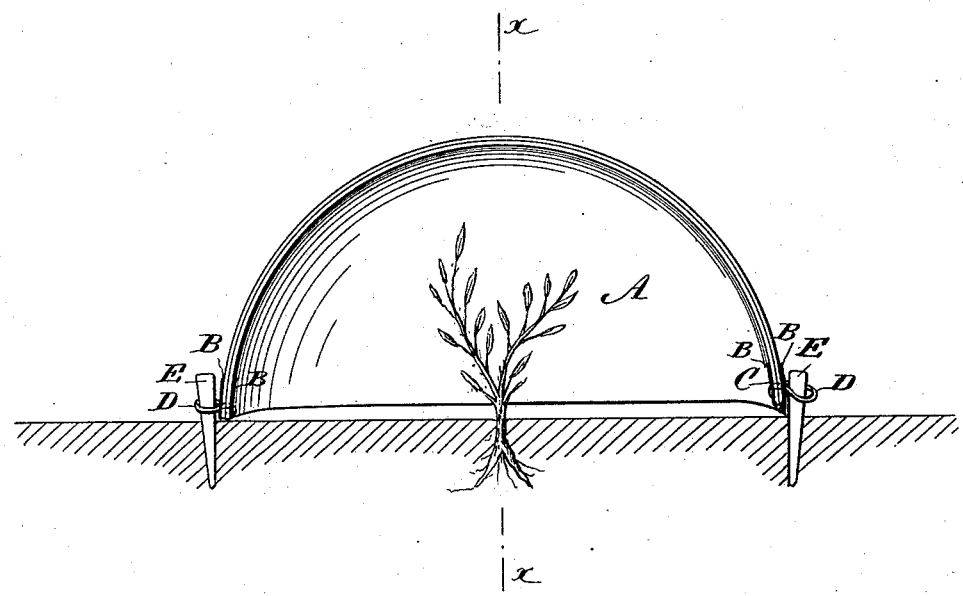
Figure 2:
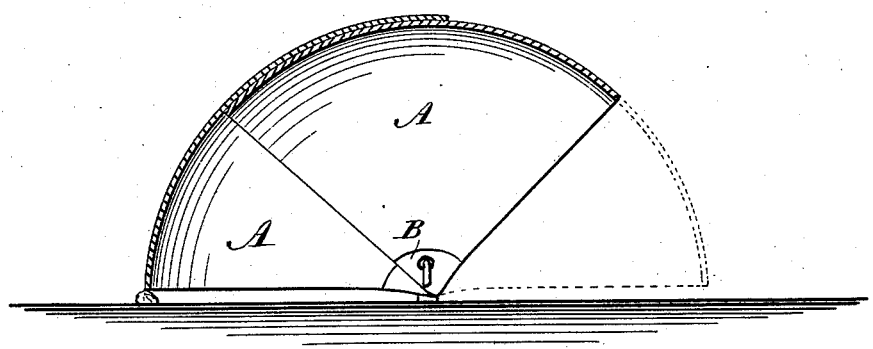
Figure 3:
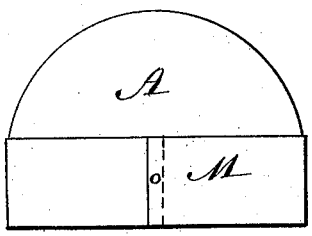

Figure 1 is a longitudinal elevation of my improved plant-protector, showing it opened. Fig. 2 is a cross-sectional view of the same, showing it partly closed; and Fig. 3 is side elevation of a slightly-modified form of my protector.

The protector is formed of two pieces, A, of paper, which have the shape of a pointed ellipse, and have their longitudinal axis curved semicircularly and the transverse axis curved to form a quadrant, thus each forming a quarter of a hollow globe. The points or ends of the pieces A are provided with sheet-metal strengthening-plates B. One section or piece A is placed within the other. The two pieces are hinged or pivoted together by means of rivets C, which pass through the sheet metal on the ends of the sections, which rivets are formed with loops or eyes D on the outer ends, through which eyes or loops stakes E are driven, to hold the protector on the ground.

The protector can be made of sheet metal, pasteboard, or any other analogous material, and is preferably made water-proof.

If a plant is to be covered and protected, the protector is placed and secured on the ground and over the plant, and the two sections are swung from each other to form half of a hollow globe over the plant. If the plant is to be ventilated or exposed to a slight draft, one section A is swung up more or less, and a stone or piece of wood is placed under the lower edge of the other section, thus permitting the air to circulate through the protector. Either section A can be raised more or less, according to the direction of the wind.

By means of my improved plant-protector the plants can be protected from wind, rain, heat, &c., very easily.

The protector can be of any suitable size, according to the size of the plants.

In those cases where the plants are so high that they cannot be covered by a plant-protector formed in the shape of a half-globe, I place a ring under the protector for the purpose of elevating it, which ring is formed of two half-rings, M, pivoted to each other.

Having thus described my invention, I claim as new and desire to secure by Letters Patent—

1. As a new article of manufacture, a plant-protector consisting, essentially, of two bottomless quarter-globe sections pivoted together at their lower adjacent ends, whereby they may be folded one within the other and extended to cover plants, substantially as set forth.

2. In a plant-protector, the combination, with the two bottomless sections A, each having the shape of a quarter of a hollow globe, of the rivets C, having eyes or loops D formed on their outer ends, substantially as herein shown and described.

WILLIAM HENRY BROWN.

Witnesses:
 JAS. SOMERVILLE,
 WM. L. TATE.